Patented May 20, 1941

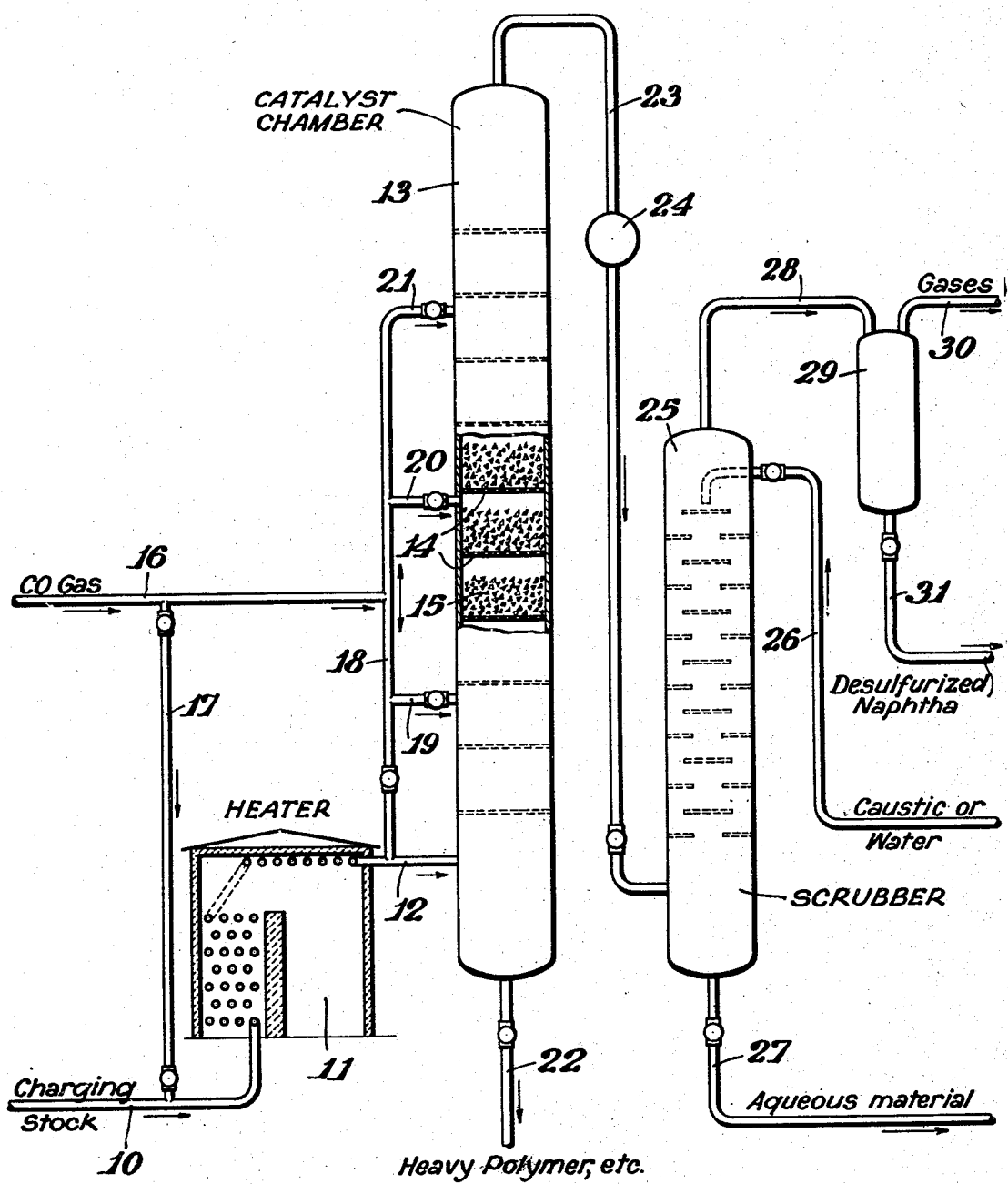

2,242,387

UNITED STATES PATENT OFFICE 2,242,387

CATALYTIC DESULPHURIZATION

George A. Boyd, Chicago, Ill., assignor to Standard Oil Company, Chicago, Ill., a corporation of Indiana Application October 9, 1937, Serial No. 168,119

6 Claims. (Cl. 196—28)

This invention relates to catalytic oil conversion and it pertains more particularly to an improved combination of catalysts which may be employed under various conditions of temperature and pressure to effect desulphurization, isomerization, reforming or other processes for the preparation of high quality motor fuel.

Bauxite has heretofore been suggested as a catalyst for such processes but its use has been subject to the serious drawback that its catalytic activity is relatively short-lived. An object of my invention is to increase the effectiveness of bauxite as a catalyst, and to extend its life. A further object is to provide improved gas purification and conversion processes. Other objects will be apparent from the following detailed description.

In practicing my invention I employ carbon monoxide to supplement the catalytic action of the bauxite, to increase its efficiency, and to extend its effective life. The invention will be more clearly understood by reference to the accompanying drawing which forms a part of this disclosure, and which diagrammatically represents that portion of a vapor phase purification conversion process wherein my invention is employed.

My charging stock may be hydrocarbon gases (both natural and refinery), light naphtha, heavy naphtha, gas oils, crude, reduced crude and mixtures of hydrocarbon gases and heavy naphtha or gas oil, etc.

The stock is introduced through line 10 to heater or pipe still 11 and thence through transfer line 12 to catalytic conversion chamber 13. This chamber is preferably a column containing spaced trays 14 supporting layers 15 of catalyst material. The catalyst is preferably bauxite, although I may use alumina deposited on silica gel or other catalytic or absorbent material containing aluminum oxide as an active ingredient. It should be understood, of course, that instead of employing a single vertical catalytic chamber I may employ a plurality of such chambers, or I may employ tubes loosely packed with catalyst and connected in series or parallel.

Carbon monoxide gas is introduced from line 16 through line 17 into charging stock inlet 10, through line 18 into transfer line 12 and/or through lines 19, 20 or 21 at spaced points along the length of the catalyst chamber. Preferably, most of the carbon monoxide is introduced thru line 18.

Heavy polymers and tarry matter, sludge, etc., may be withdrawn from the base of the catalyst chamber through valved line 22. Reaction products, products of the motor fuel boiling range, etc., are withdrawn through line 23 through cooler 24 and are then introduced at the base of scrubber 25, wherein the products may be scrubbed with water or preferably with an aqueous caustic solution introduced through line 26. The aqueous material is withdrawn from the scrubber through line 27 and the gases and hydrocarbons are withdrawn from the top of the scrubber through line 28 which leads to separator trap 29. Gases are withdrawn from the trap through line 30 and liquids are withdrawn through line 31. In the gas conversion processes the aqueous scrubbing step may sometime be unnecessary.

The invention is particularly applicable to the desulphurizing of light naphtha or gasoline stocks, particularly to cracked gasoline stocks or gasoline stocks which have been produced by the polymerization of refinery gases. In operating on such a stock I preferably close the valve in line 17 and introduce the carbon monoxide chiefly through line 18 to transfer line 12, although small amounts of the carbon monoxide may be introduced through lines 19, 20 and 21. The amount of carbon monoxide introduced will depend somewhat on the stocks charged, particularly on the amount of sulphur combined therewith. I prefer to employ about 2 to 20% by volume of carbon monoxide gas based on the volume of vaporized naphtha. By preliminary experiments the proportion of carbon monoxide may be determined more accurately.

For the desulphurizing of light naphtha or gasoline stocks, as hereinabove described, I prefer to heat the stock in heater 11 to a temperature of about 375 to 475° F. but temperatures up to 850° F. may be employed. I prefer to maintain the temperature and pressure in the catalyst chamber to prevent condensation of the heavier naphtha components on the catalyst. It should be understood, of course, that the carbon monoxide gas introduced through lines 18 to 21 may likewise be heated to make up for radiation losses in the chamber and to prevent the condensation of naphtha vapors on the catalyst.

The introduction of carbon monoxide helps to vaporize the naphtha but its important function is to catalytically coact with the bauxite (alumina) in converting the sulphur compounds in the naphtha to removable form. I cannot state whether the carbon monoxide acts as a promoter for bauxite desulphurization or whether the bauxite acts as a promoter to cause a reaction of carbon monoxide with sulphur compounds, but it is desirable to convert the sulphur compounds into carbonyl sulphide (carbon oxysulphide), so that they may be readily separated from the oil in the later scrubbing steps and so that the efficiency of the bauxite will not be impaired by deposition of sulphur compounds thereon.

The naphtha vapors together with unused carbon monoxide, carbonyl sulphide, and other reaction products are cooled in exchanger 24 to about room temperature and are then scrubbed with a dilute caustic solution for the removal of carbonyl sulphide and other sulphur conversion products. The spent scrubbing liquid is withdrawn through line 27 for regeneration and the desulphurized naphtha is separated from carbon monoxide and other gaseous reaction products in trap 29, the desulphurized naphtha being withdrawn through line 31 to storage. It should be understood that fractionation and treatment of the hydrocarbons may be effected under conditions of temperature and pressure and in apparatus well-known in the art.

As hereinabove stated, I may use other aluminum oxide containing materials instead of bauxite. For instance certain bauxite residues are readily available and highly effective as a catalyst for the desulphurizing and reforming of naphthas and gasoline stocks, both in the presence and in the absence of carbon monoxide. An example of such residue is shown by the following analysis:

| | Per cent |
|---|---|
| $Al_2O_3$ | 28–34 |
| $SiO_2$ | 19–25 |
| $TiO_2$ | 15–20 |
| $Fe_2O_3$ | 1–2.5 |

In general higher temperatures are required when this residue is used in the absence of CO than are necessary for use with CO.

The titanium oxide in the above residue may account partly for its catalytic activity. Similarly, I may use thoria as a promoter for my bauxite catalyst. The thorium or titanium oxides may be co-precipitated with an alumina catalyst or may be added to a bauxite catalyst and used either in the presence or absence of CO. Both of these promoters appear to have a beneficial effect not only upon desulphurization but also on the isomerization or reforming of naphthas.

The use of carbon monoxide with bauxite, with or without promoters, appears to play an important part in high temperature conversion processes such as naphtha reforming, isomerization, etc. The exact temperature conditions for these uses is dependent upon the nature of the charging stocks and the desired properties of finished products. Charging stocks may be hydrocarbon gases (both natural and refinery), light naphtha, heavy naphtha, "low knock rating" gasoline and mixtures thereof. These stocks are heated to temperatures of about 650 to 1100° F. under pressures of about 200 to 3000 pounds and contacted with a bauxite catalyst in the presence of carbon monoxide in a manner similar to that hereinabove described. This treatment at high temperatures and pressures in the presence of bauxite and carbon monoxide apparently causes a re-arrangement of the hydrocarbon molecules and may therefore be referred to as "reforming" or "isomerization." Low knock rating naphthas and gasoline may be converted by such a process into a motor fuel with a very high knock rating. During the course of this reaction there may be cracking, polymerization, gas reversion or alkylation reactions—the exact nature of the reactions has not been ascertained. By operating under the conditions hereinabove set forth, however, it is possible to convert low grade charging stocks into high quality motor fuel.

One of the important features of my process as applied to desulphurization and naphtha reforming is that the process produces a very high percentage of isomeric hydrocarbons, i. e., hydrocarbons having a highly branched structure. For example, in the desulphurization process I find that the octane number of the product is improved much more than can be accounted for by the removal of the sulphur. This indicates a considerable degree of isomerization of the normal and near normal paraffin hydrocarbons and olefin hydrocarbons to more highly branched hydrocarbons. There may be a tendency for the double bonds in the olefin hydrocarbons to shift to a position which renders the octane number of the product higher.

A feature of my invention is the prolonged life of the catalyst. However, it is necessary at intervals to revivify the bauxite, and this may be accomplished by blowing with air under controlled conditions of oxidation (the temperature should not exceed about 800 to 900° F). The revivification may be effected entirely with carbon monoxide or the air may be supplemented or followed by high temperature carbon monoxide treatment.

It should be understood that the drawing in this case is highly simplified. Additional equipment including pumps, fractionating equipment, compressors, heat exchangers, valves, etc., will be required for the handling of the feed products, recycle stocks, etc. One skilled in this art today will be able to make the necessary detailed layout after having read the description given herein. The layout will vary from case to case, depending upon the particular refinery situation and the exact nature of the stock to be processed.

I claim:

1. The method of desulphurizing light naphtha which comprises heating a sulphur-bearing light naphtha stock to a temperature of about 375 to about 475° F., introducing carbon monoxide into said naphtha and contacting the mixture of carbon monoxide and heated naphtha with a catalyst containing alumina.

2. The method of claim 1 wherein the catalytic contact of the carbon monoxide naphtha mixture with the catalyst is effected in the vapor phase.

3. The method of preparing a high quality motor fuel from a naphtha containing objectionable sulphur compounds, which comprises treating said naphtha with carbon monoxide in the presence of bauxite at a temperature of about 375 to 475° F., cooling the treated products and separating converted sulphur compounds and gases from the treated naphtha.

4. The method of preparing high quality motor fuels from sulphur-containing light hydrocarbons which comprises heating said light hydrocarbons to a temperature of between about 375° F. and 475° F., contacting said heated hydrocarbons with bauxite in the presence of from 2 to 20% of carbon monoxide (based on the volume of heated hydrocarbon gas), cooling the reaction products, separating sulphur compounds therefrom, and separating naphtha from the gaseous products of the reaction.

5. The method of class 1 wherein the alumina is promoted with an oxide of the group consisting of thorium oxide and titanium oxide.

6. The method of claim 1 wherein the alumina is in the form of a bauxite residue.

GEORGE A. BOYD.

CERTIFICATE OF CORRECTION.

Patent No. 2,242,387. May 20, 1941.

GEORGE A. BOYD.

It is hereby certified that error appears in the printed specification of the above numbered patent requiring correction as follows: Page 2, second column, line 68, claim 5, for "class 1" read --claim 1--; and that the said Letters Patent should be read with this correction therein that the same may conform to the record of the case in the Patent Office.

Signed and sealed this 1st day of July, A. D. 1941.

(Seal)
Henry Van Arsdale,
Acting Commissioner of Patents.